United States Patent Office 3,118,860
Patented Jan. 21, 1964

3,118,860
POLYMETHACROLEIN DERIVATIVES
Robert Lee Eifert and Barnard Mitchel Marks, Wilmington, Del., assignors to E. I. du Pont de Nemours and Company, Wilmington, Del., a corporation of Delaware
No Drawing. Filed Nov. 9, 1959, Ser. No. 851,505
20 Claims. (Cl. 260—73)

The present invention relates to novel polymeric materials, and, more particularly, to polymeric materials derived from high molecular weight, soluble polymers of methacrolein. The present application is a continuation-in-part of copending application Serial No. 708,373, filed January 13, 1958, now Patent No. 3,000,862.

Methacrolein and other 2-substituted acroleins possess an inherent tendency to undergo autopolymerization to form infusible, insoluble resins which are of little or no value as a plastic material. Recently, however, methods have been discovered by which it is possible to polymerize methacrolein to high molecular weight polymers which are soluble in a number of organic solvents. The polymers thus prepared have inherent viscosities substantially above 0.3, as determined by methods hereinafter defined, they soften at about 243° C., and can be molded into stiff transparent films at temperatures of 250° C. to 300° C. The polymethacroleins prepared by these novel methods are substantially linear, non-cross-linked addition polymers containing pendant methyl groups and pendant aldehyde groups. The aldehyde groups of the polymethacrolein impart a high chemical reactivity to the polymer which can be utilized to prepare novel and useful polymethacrolein derivatives having properties substantially modified from those of the parent polymer.

It is one of the objects of the present invention to prepare organic-solvent soluble derivatives of high molecular weight polymethacrolein prepared by addition polymerization. It is another object to modify the chemical structure and the physical properties of high molecular weight polymethacrolein by reaction of the pendant aldehyde groups of the polymer. Other objects will become apparent hereinafter.

The objects of the present invention are accomplished by reacting a substantially linear, high molecular weight polymer of methacrolein with a non-phenolic alcohol in the presence of an acid catalyst, and recovering a high molecular weight substantially linear, organic solvent soluble resin of outstanding retention of rigidity at elevated temperatures, the infrared spectrum of which shows substantial absence of aldehyde groups. The polymers obtained by the process of the present invention differ in chemical structure from the polymers which would be expected from the normal reaction of the aldehyde group with an alcohol. Thus, the expected reaction of an aliphatic alcohol with polymethacrolein is illustrated by the following chemical equation:

(1) 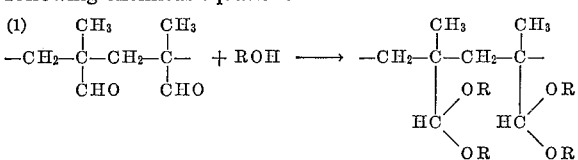

where R is an aliphatic radical.

However, it was discovered that the polymeric derivatives prepared by the process of the present invention contain in addition to the above-recited structures the following structures (2) and (3) in the polymer chain (2) 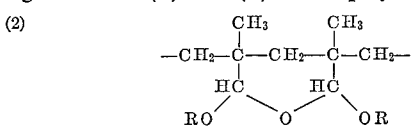

(3) 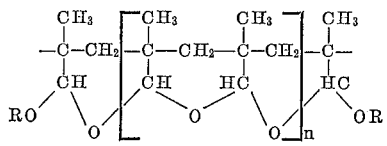

where R has the same meaning as above, and $n$ is 1 and greater than one.

The proportion of structures, such as (2) and (3) can be changed by the variation in reaction conditions such as temperature, concentration of reagents, and concentration of catalysts. Evidence for the formation of the tetrahydropyran structure is found in the limited reaction of the alcohol with the resin, which is far below that expected of theoretical values shown by Equation 1 combined with the complete disappearance of the carbonyl absorption for aldehydes in the infrared spectrum. The unusual high temperature stiffness of these amorphous polymeric acetals, as shown by the table below, is also indicative of such structural arrangement.

[Stiffness moduli vs. temp. (p.s.i.×10⁻³)]

|  | Polymethacrolein Methyl Acetal | Polymethacrolein Butyl Acetal | Polymethacrolein |
|---|---|---|---|
| RT, °C | 350–429 | 250–300 | 537 |
| 100° C | 280–305 | 150–190 | 450 |
| 130° C |  |  | 339 |
| 160° C | 220–255 | 130–175 | (¹) |
| 200° C | 160–240 | 100–160 | (¹) |
| 250° C | 112–121 | 20–60 | (¹) |

¹ Too flexible to measure.

Further evidence for the existence of these structures in the resins of the present invention was determined by comparisons of infrared spectra of model compounds containing tetrahydropyran structures with infrared spectra of the resins.

The methacrolein polymers useful in the present invention are polymethacrolein and copolymers of methacrolein with unsaturated acid esters such as esters of acrylic, methacrylic, fumaric and maleic acid and include, more specifically, such esters as the methyl, ethyl, ethoxyethyl, propyl, butyl, hexyl, benzyl, octyl, isooctyl, dodecyl esters of acrylic and methacrylic acid, and such esters as the dimethyl, diethyl, methyl ethyl, dipropyl, propyl methyl, propyl ethyl esters of fumaric and maleic acid. The methacrolein copolymers employed in the present invention are principally those which contain more than 50% of methacrolein in the copolymer.

The methacrolein polymers employed in the present invention are prepared by polymerization of the monomer or a mixture of the monomers in an aqueous medium in which the monomers are soluble but in which the polymer is not soluble and from which the polymer precipitates to form a dispersion. The formation of a coagulated polymer mass must be avoided to prevent the formation of a crosslinked polymer which is insoluble and intractable and thus not suited for the formation of the polymer derivatives of the present invention. The formation of the crosslinked intractable polymer is believed to result from the further reaction of pendant aldehyde groups in the polymer chains; such reaction can readily occur where the polymer remains in solution. By polymerizing the monomer to finely-divided polymer particles, the crosslinking reaction is negligible and the polymerization results in the formation of substantially linear polymers. This is achieved by employing a polymerization medium in which the monomer is soluble and in which the polymer is insoluble, and carrying out the polymerization under conditions favoring the formation of dispersed polymer. The catalyst employed to initiate the addition polymerization of methacrolein is a free-radical catalyst soluble in the polymerization medium. Although a large variety of free-radical catalysts may be employed, such as peroxides, for example, it is generally preferred to employ redox catalysts, since these catalysts are soluble in aqueous media and are, furthermore, less dependent on temperature with respect to the rate of free-radical formation. Redox catalysts which are suitable for the polymerization may be formed by the reaction of soluble multivalent metal salts in their higher valence states or by the reaction of any other soluble oxidizing agents, such as inorganic peroxides, examples of which are hydrogen peroxide and potassium persulfate, with the alkali metal or ammonium salt of reducing inorganic anions such as the hypophosphite, thiosulfate, sulfite, bisulfite or hyposulfite ions. It was further found that in the polymerization of methacrolein the oxidizing agent could be omitted and that the polymerization of methacrolein and the copolymerization of methacrolein could be initiated by simply adding the reducing agent to the reaction medium, a particularly preferred catalyst being an alkali metal or ammonium bisulfite. The quantity of the catalyst employed, calculated on the basis of the reducing agent, is critical and should not exceed 0.005 mol percent of the total monomer concentration. Higher concentrations lead to the formation of lower molecular weight polymers. A suitable catalyst concentration range is from 0.001 to 0.005 mol percent.

The polymerization is preferably carried out in the presence of a finely-divided solid such as silica, titania, zirconia, alumina and similar materials. The addition of such compounds such as silica aids in the formation of linear polymers for reasons at present not clearly understood, but possibly the presence of the solid aids in the formation of stable polymer dispersions. The solid need only be employed in minute quantities such as 0.005% by weight of the polymerization medium.

Since the solubility of methacrolein and the acrylic comonomers in water is limited and more concentrated solutions of methacrolein and acrylic monomer are desirable in order to prepare methacrolein polymers having high molecular weights at efficient polymerization rates, reaction media comprising water and organic solvents which are miscible with water and which increase the solubility of the methacrolein and its comonomers in the reaction medium are preferably employed. The low molecular weight alcohols are suitable for such purposes. Particularly preferred are aliphatic alcohols having from 1 to 5 carbon atoms, such as methanol, ethanol, butanols, isopropanol, etc. The quantity of the alcohol employed will depend on the amount of the monomers that is required to be in solution. The monomer concentration in the reaction medium is maintained in a range of 7 to 40% and preferably from 20 to 40% by weight of the medium. Higher concentrations cause coagulation of the dispersed polymer. If desirable, the concentration may be slightly increased by the addition of dispersing agents which inhibit the coagulation of the polymer formed.

The polymerization is preferably carried out at temperatures below 50° C. and preferably at temperatures of 20 to 35° C. in the substantial absence of oxygen. The monomers employed should be free from impurities. It is, therefore, highly desirable to purify commercially available methacrolein by distillation or treatment with absorbents which will remove the impurities prior to use on the polymerization. The polymerization is furthermore preferably carried out in a slightly acidic medium.

A typical homopolymerization of methacrolein is as follows: Into a clean three-necked 500 ml. flask equipped with a stirrer, nitrogen inlet and outlet and thermometer, is charged, under nitrogen, 275 ml. of distilled deoxygenated water, to which 0.25 ml. of tetraethyl orthosilicate is added drop-wise. To the reaction mixture is then added with agitation 75 ml. of deoxygenated methanol, 5 mg. of copper oxide and 0.8 ml. of a 1% solution of sodium bisulfite and 50 ml. of methacrolein. On addition of all of the reagents, agitation is stopped and polymerization is allowed to proceed undisturbed. The temperature is maintained at 25° C. The solution becomes opalescent after 20 minutes. Polymerization is continued for 20 hours. An antioxidant is added to the resulting polymer dispersion; the dispersion is then coagulated by the addition of sodium sulfate. The reaction mixture is filtered, the solid polymeric precipitate is washed with water and methanol, treated with a methanolic solution of an antioxidant and dried in a vacuum. The solid white polymer isolated is soluble in dimethyl formamide and has an inherent viscosity above 0.9 and can be molded into transparent films at a temperature of 250 to 275° C.

A typical copolymerization of methacrolein is as follows:

Into a glass-stoppered Erlenmeyer flask was charged under nitrogen with mild agitation 96 ml. of deoxygenated, distilled water, 0.4 ml. of "Ludox," a commercially-available aqueous dispersion of colloidal silica containing approximately 30% of silicon dioxide, 100 ml. of methanol, 97 ml. of methacrolein, 3 ml. of ethyl acrylate, 3.6 ml. of a 1% aqueous solution of sodium bisulfite as the catalyst, corresponding to a catalyst concentration of $1.15 \times 10^{-3}$ moles per liter of reaction medium, and four drops of acetic acid to bring the pH of the reaction mixture to 4.4. On addition of the ingredients, the reaction mixture was allowed to stand for a period of 20 hours.

To the resulting polymer dispersion was added 35 ml. of a 2% solution of 2,6-di-tert.butyl-4-methylphenol to stabilize the polymer. The dispersion was then coagulated by the addition of sodium sulfate. The polymer was collected by filtration, washed with water and methanol, treated again with the same quantity of antioxidant, and dried in a vacuum oven. A white solid polymer comprising 62.7% of the starting material, having an inherent viscosity of 1.11 and a softening point of approximately 240° C. was obtained.

The polymeric methacrolein acetals of the present invention are prepared by reacting dispersed polymer or a solution thereof with the alcohol in the presence of an acid catalyst dissolved in the alcohol. The catalysts that may be employed in the formation of the acetals are such well known acidic catalysts as sulfuric acid, thionyl chloride, sulfur dioxide, p-toluene sulfonic acid, hydrogen chloride, phosphoric acid, and polyphosphoric acid. Solvents which are suitable for dissolving the polymethacrolein are dimethyl formamide, pyridine, dimethyl acetamide, dimethyl sulfoxide and tetramethylene-cyclic-sulfone.

The preferred method of carrying out the acetalation of the present invention and one which will result in a substantial quantity of the acetal being introduced into the polymer derivative comprises carrying out the reaction with excess alcohol at elevated temperatures of 40 to 100° C., under anhydrous conditions using a swelling agent for the polymer and a catalyst selected from the group consisting of hydrogen chloride and thionyl chloride. Swelling agents for methacrolein polymers are aromatic hydrocarbons, chlorohydrocarbons, and ethers having more than 4 carbon atoms such as toluene, benzene, chloroform and dioxane.

The alcohols employed in the formation of the acetals are aliphatic alcohols, such as methanol, ethanol, butanol, isopropanol, decanol and isodecanol tridecanol, aralkyl alcohols, such as benzyl alcohol, alicyclic alcohols, such as cyclohexanol, and substituted alcohols containing halogen or sulfur radicals, such as ethylene chlorohydrin and 2-mercaptoethanol. More than one alcohol may be used in the formation of the acetals of the present invention.

The alcohols used in the formation of the acetal derivatives include primary, secondary and tertiary alcohols, including straight chain, as well as branched chain alcohols, although it is generally preferred to employ primary and secondary alcohols containing less than 20 carbon atoms. Physical properties of the various acetals will, however, differ depending on the size and structure of the alcohol employed.

The formation of the novel acetal derivatives is further illustrated by the following examples.

Example I

Into a 350 ml. flask equipped with a water separator was charged 39.5 g. of decanol, 50 ml. of benzene and 7 g. of polymethacrolein having an inherent viscosity of 0.75. To the reaction mixture was then added 0.1 g. of p-toluene sulphonic acid. The reaction mixture was refluxed for 6 hours in which time 1 ml. of water was removed from the reaction mixture, which was then allowed to stand at room temperature for an additional 8 days. The reaction mixture was then filtered. On washing and drying, there was obtained 7.5 g. of a polymethacrolein decyl acetal. The polymer could be compression molded into clear rigid films on heating to 275° C. Infrared analysis indicated substantial absence of aldehyde groups in the polymer.

Example II

Into a 250 ml. flask equipped with a water separator was charged 90 ml. of n-butanol, 6 g. of polymethacrolein having an inherent viscosity of 0.4, 50 ml. of toluene, and 0.2 g. of p-toluene sulfonic acid. The reaction mixture was refluxed for a period of 24 hours and allowed to stand for an additional two days. During reflux, 0.5 ml. of water was collected and the polymer dissolved. At the end of the reaction the polymer was precipitated by pouring into methanol containing a little sodium methoxide. After filtering off the polymer, washing and drying, there was isolated 6.8 g. of polymethacrolein butyl acetal. The polymer could be compression molded at 275° C. into stiff, transparent films. Infrared analysis showed substantial absence of aldehyde groups in the polymer.

Example III

Into a reaction flask there was charged 50 ml. of ethylene chlorohydrin and 5 g. of polymethacrolein having an inherent viscosity of 0.59. On solution of the polymethacrolein in the ethylene chlorohydrin, 0.1 ml. of a 40 mol percent solution of boron trifluoride in ortho-phosphoric acid was added. The resulting reaction mixture was allowed to stand at room temperature for a period of 6 days. The reaction mixture was then poured into 300 ml. of water containing 1.5 g. sodium carbonate, and the polymer precipitate was isolated, washed and dried. The product weighed 5 g. and was found to contain 3.3% chlorine corresponding to approximately 10% reaction to the completely acetalized derivative. A film molded at 275° C. was stiff and transparent. The infrared analysis showed substantial absence of aldehyde groups in the polymer derivative.

Example IV

Into a 250 ml. glass reaction flask was charged 6 g. of polymethacrolein, 38 ml. of ethanol and 132 ml. of chloroform. The polymer dissolved in the mixed solvents and 0.1 g. toluene-sulfonic acid was added. The reaction mixture was allowed to stand for 18 hours at room temperature. The reaction mixture was then neutralized with sodium bicarbonate, filtered and precipitated by adding cyclohexane. The polymer was collected by filtration and dried. A colorless, porous solid, soluble in pyridine was produced.

Example V

Into a reaction flask was charged 5 g. of polymethacrolein having an inherent viscosity of 0.8 and 50 ml. of 2-mercaptoethanol. The polymer dissolved in the reagent and 0.3 ml. of a 40 mol percent solution of boron trifluoride in ortho-phosphoric acid was added. The reaction mixture was allowed to stand at room temperature for a period of 24 hours. The reaction mixture was neutralized with sodium carbonate, filtered and precipitated with methanol. The polymer was collected by filtration, washed with methanol and dried. The resulting polymethacrolein thioacetal weighed 4.2 g. and was found to contain 4.5% sulfur, which corresponded to approximately 15% reaction to the theoretically completely-acetalized derivative. A film molded at 275° C. was stiff and transparent. The infrared analysis of the film showed a substantial absence of aldehyde groups in the polymer derivative.

Example VI

Into a 2-liter flask equipped with agitator, water separator and condenser, was placed 20 g. of ethyl acrylate methacrolein copolymer containing the monomers in a ratio of 1.4 to 98.6, and having an inherent viscosity of 1.1. To this was added 100 ml. of n-hexyl alcohol that was freed of moisture by passing through a silica gel column. After 10 minutes of mixing an additional 100 ml. of hexyl alcohol containing 4.0 g. of anhydrous hydrogen chloride was added and the mixture was stirred to form a uniform paste. After 6 minutes, 50 ml. of dry toluene, a swelling agent, was added and stirring continued. Heat was applied to raise the reaction temperature to 65 to 85° C. and an additional 50 ml. of dry n-hexyl alcohol, 50 ml. of dry toluene and 4 g. of hydrogen chloride was added. Within 20 minutes thereafter, a clear transparent solution at 85° C. was obtained. After 30 minutes, an additional 400 ml. of n-hexanol was added. The reaction was discontinued after 90 minutes at which time the temperature had risen to 104° C.

The reaction mixture was then neutralized by addition of slight excess of methanolic potassium hydroxide. Addition of excess methanol caused the polymeric methacrolein derivative to precipitate. The polymer derivative was washed with methanol and water, dehydrated with methanol, and then vacuum dried at 50° C. to a constant weight. The polymeric methacrolein derivative obtained weighed 25.2 g., had an inherent viscosity of 1.15 and an acetal content of 2.92 milliequivalent/g. out of the theoretical maximum of 7.8 milliequivalent/g. The polymer derivative could be compression molded into clear and transparent films at temperatures of 250° C. Flexural modulus of fabricated samples was measured to range from 200,000 to 245,000 p.s.i. at room temperature; the yield stress of samples was measured to be from 5,000 to 6,000 p.s.i. with an elongation of 75 to 120%.

Example VII

Using the equipment described in Example VI, 45 g. of methacrolein ethyl acrylate copolymer containing 1.4% of ethyl acrylate and having an inherent viscosity of 1.33 was mixed with 200 ml. of methanol, dried over silica and 100 ml. of toluene. After 10 minutes, an additional 200 ml. of methanol and 100 ml. of toluene was added to the mixture. Dry hydrogen chloride was then bubbled through the reaction mixture for 30 minutes. Thereafter, an additional 200 ml. of methanol was added and the mixture was heated on a water bath for five hours at a temperature of 80 to 90° C. During that period, an additional 200 ml. of toluene and 600 ml. of methanol was added. The clear solution obtained was worked up in the manner described in Example VI. The resulting polymeric methacrolein methyl acetal weighed 51.4 g. and was found to have an inherent viscosity of 1.42. The derivative could be molded into transparent, rigid films having a flexural modulus of 350,000 to 429,000 p.s.i. and a tensile stress of 8000 to 9000 p.s.i. A solution of the derivative in dimethyl formamide could be spun into monofilaments, by passing through aqueous methanol, which could be drawn and oriented. Infrared analysis of a film sample showed complete absence of aldehyde groups.

*Example VIII*

Employing the equipment described in Example VI, 26.1 g. of an ethyl acrylate-methacrolein copolymer containing 1.6% of the ethyl acrylate and having an inherent viscosity of 0.85 was mixed with 150 ml. of 2-ethyl butyl alcohol, and 50 ml. of toluene. After 30 minutes of mixing, an additional 50 ml. of 2-ethyl butyl alcohol containing 5.3 g. of hydrogen chloride was added. Mixing was continued for one hour and 100 ml. of ethyl butyl alcohol was added. The reaction mixture was then heated at 85 to 90° C. until a clear solution was formed. The resulting solution was suitable for spinning the derivative into monofilaments by passing the solution through a coagulating bath of methanol. The polymeric methacrolein derivative was isolated as in the preceding example. The polymeric methacrolein 2-ethyl-butyl acetal obtained weighed 35.5 g., had an inherent viscosity of 0.7 and an acetal content of 2.35 milliequivalent/g. of theoretical total of 7.8 milliequivalent/g.

*Example IX*

Employing the procedure set forth in the preceding example, the octadecyl acetal of a copolymer of methacrolein and ethyl acrylate containing 1.4% of ethyl acrylate was prepared from 24.5 g. of the copolymer having an inherent viscosity of 1.0 employing a total of 250 ml. octadecanol and 250 ml. of toluene. The resulting polymeric methacrolein octadecanol acetal weighed 49.7 g. Tough, translucent films could be molded from the copolymer by heating to 200° C. under 1500 p.s.i. pressure.

*Example X*

The procedure set forth in Example VII was employed to prepare the decyl acetal of a methacrolein copolymer containing 1.4% of ethyl acrylate and having an inherent viscosity of 1.15. A total of 600 ml. of decyl alcohol and 200 ml. of toluene and 60.4 g. of copolymers was employed. On drying, there was obtained 93.6 g. of the decyl acetal having an inherent viscosity of 0.85.

*Example XI*

Example VIII was repeated using benzyl alcohol in place of the 2-ethyl butyl alcohol. The benzyl acetal of polymeric methacrolein was isolated.

*Example XII*

Example VI was repeated using 20 g. of a copolymer of methacrolein and butyl acrylate containing 23% of the acrylate in the copolymer. A total of 23.5 g. of the n-hexyl acetal of the copolymer was isolated.

*Example XIII*

Employing the procedure set forth in Example VIII, 25 g. of a copolymer of methacrolein and dimethyl maleate containing 3% of the dimethyl maleate was acetalized with a total of 300 ml. of n-butanol and 100 ml. of toluene and 5 g. of hydrogen chloride. The butyl acetal isolated could be molded into transparent, rigid films.

The examples have illustrated the formation of novel derivatives from soluble high molecular weight methacrolein and are not to be understood as limiting the present invention thereto. The molecular weights of the polymethacrolein derivatives of the present invention are within the range such as to make these derivatives of value in plastic applications and particularly as extruded, molded and solvent cast resins. The molecular weight of methacrolein polymers and their derivatives is best determined by employing a relative measure such as inherent viscosity. The inherent viscosity measurements enumerated in the above examples were obtained by employing a 0.5% solution of the polymer derivative in dimethyl formamide, unless otherwise stated, measuring the viscosity of the solution and the solvent at 35° C., and calculating the inherent viscosity from the following equation:

$$\eta_{inh} = \ln \frac{t}{t_0} \times \frac{1}{c}$$

wherein $t_0$ is the viscosity of the solvent and $t$ the viscosity of the solution and $c$ the concentration of the polymer in grams per 100 cc. of solvent.

The softening points were obtained by passing a sample of the polymer across a hot stage under slight pressure. The temperature at which the polymer leaves a trail of molten polymer is considered the softening point temperature of the polymer.

The polymeric methacrolein acetals of the present invention generally contain from 0.5 to 5 milliequivalents/g. of polymer of acetal groups, depending on the reaction conditions employed as described hereinabove. The acetal content of the derivatives of the present invention is determined by forming the acetate from the acetal through reaction with excess acetic acid using boron trifluoride as the catalyst. The ester is recovered by an azeotropic distillation with heptane and the distillate is then quantitatively saponified. From the saponification equivalent, the acetal content of the derivative is then calculated.

The polymethacrolein derivatives of the present invention fuse to colorless, transparent films. The polymethacrolein derivatives of the present invention can be cast into sheets and films from solutions in organic solvents; they may also be fabricated into shaped articles by compression molding, and fibers may be prepared from the derivatives by solution spinning. The polymer derivatives may be employed in the manufacture of ornamental designs, lighting fixtures and outdoor signs. The polymethacrolein derivatives may be further stabilized by the inclusion of light stabilizers, antioxidants and other additives. Pigments, fillers and other polymeric materials may be blended with the polymeric methacrolein derivatives. The polymeric acetals of methacrolein of the present invention have a more desirable combination of properties at elevated temperatures as compared with the unmodified polymethacrolein, as well as solubility in a wider variety of common organic solvents. This is believed to be in part due to the substituted tetrahydropyran structure which forms during the reaction leading to the derivatives of the present invention.

We claim:

1. A normally solid, high molecular weight derivative of polymeric methacrolein substantially free from aldehyde groups containing units of the following structure

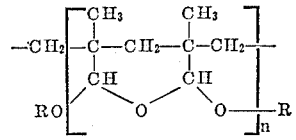

wherein R is a member of the class consisting of alkyl, aralkyl, cycloalkyl radicals and $n$ is a positive integer, said polymeric methacrolein being obtained through addition polymerization of monomers of the class consisting of methacrolein and mixtures of methacrolein and esters of unsaturated acids, the methacrolein in said mixture being at least 50% of said mixture, said polymeric methacrolein having an inherent viscosity of at least 0.3 as measured in a 0.5% solution in dimethyl formamide at 35° C.

2. The derivative of claim 1, wherein the polymeric methacrolein is a homopolymer of methacrolein.

3. The derivative of claim 1 wherein the polymeric methacrolein is a copolymer of methacrolein and an ester of unsaturated acid containing more than 50% of methacrolein.

4. A normally-solid, high molecular weight polymeric methacrolein acetal, substantially free from aldehyde groups, containing less than 50% of the maximum theoretical acetal groups, based on two alkoxy groups per methacrolein monomer unit, said polymeric methacrolein being obtained through addition polymerization of monomers of the class consisting of methacrolein and mixtures of methacrolein and esters of unsaturated acids, the methacrolein in said mixture being at least 50% of said mixture, said polymeric methacrolein having an inherent viscosity of at least 0.3 as measured in a 0.5% solution in dimethyl formamide at 35° C.

5. A normally-solid high molecular weight acetal of a homopolymer of methacrolein, substantially free from aldehyde groups containing less than 50% of the maximum theoretical acetal groups, based on two alkoxy groups per methacrolein monomer unit.

6. A normally-solid, high molecular weight, acetal of a copolymer of methacrolein and an ester of unsaturated acid, said copolymer containing at least 50% of methacrolein, said acetal being substantially free from aldehyde groups and containing less than 50% of the maximum acetal groups, based on two alkoxy groups per methacrolein monomer unit.

7. A normally-solid, high molecular weight acetal of a methacrolein addition polymer substantially free from aldehyde groups, said acetal containing from 0.5 to 5 milliequivalents acetal groups per g. of said methacrolein polymers, said addition polymer of methacrolein being obtained through polymerization of monomers of the class consisting of methacrolein and esters of unsaturated acids, the methacrolein in said mixture being at least 50% of said mixture, said addition polymer of methacrolein having an inherent viscosity of at least 0.3 as measured in a 0.5% solution in dimethyl formamide at 35° C.

8. A normally-solid, high molecular weight acetal of a methacrolein addition homopolymer substantially free from aldehyde groups containing from 0.5 to 5 milliequivalents of acetal groups per g. of said methacrolein polymer.

9. A normally-solid, high molecular weight acetal of an alkyl acrylate methacrolein addition copolymer containing from 0.1 to 25% of the alkyl acrylate, said acetal being substantially free from aldehyde groups and containing from 0.5 to 5 milliequivalents of acetal groups per g. of said copolymer.

10. The acetal set forth in claim 8 wherein the alcohol used to form the acetal contains from 1 to 20 carbon atoms.

11. The acetal set forth in claim 9 wherein the alcohol used to form the acetal contains from 1 to 20 carbon atoms.

12. The acetal set forth in claim 10 wherein the alcohol is methyl alcohol.

13. The acetal set forth in claim 10 wherein the alcohol is butyl alcohol.

14. The acetal set forth in claim 10 wherein the alcohol is hexyl alcohol.

15. The acetal set forth in claim 11 wherein the alcohol is methyl alcohol.

16. The acetal set forth in claim 11 wherein the alcohol is butyl alcohol.

17. The acetal set forth in claim 11 wherein the alcohol is hexyl alcohol.

18. The acetal set forth in claim 11 wherein the alcohol is decyl alcohol.

19. The acetal set forth in claim 11 wherein the alcohol is tridecyl alcohol.

20. The process of preparing an acetal from addition polymers of methacrolein which comprises contacting under anhydrous conditions excess quantities of an alcohol liquid at reaction conditions with an addition polymer of methacrolein containing at least 50% of methacrolein in the presence of a swelling agent selected from the class consisting of aromatic hydrocarbons, chlorohydrocarbons and ethers, the reaction being catalyzed by catalytic quantities of hydrogen chloride, said addition polymer of methacrolein being obtained through polymerization of monomers of the class consisting of methacrolein and esters of unsaturated acids, the methacrolein in said mixture being at least 50% of said mixture, said addition polymer of methacrolein having an inherent viscosity of at least 0.3 as measured in a 0.5% solution in dimethyl formamide at 35° C.

References Cited in the file of this patent

UNITED STATES PATENTS

| | | |
|---|---|---|
| 2,212,894 | Allen | Aug. 27, 1940 |
| 2,467,430 | Izzard | Apr. 19, 1949 |
| 2,485,239 | Izzard | Oct. 18, 1949 |
| 2,569,932 | Izzard | Oct. 2, 1951 |
| 2,993,878 | Marks | July 25, 1961 |

FOREIGN PATENTS

| | | |
|---|---|---|
| 1,016,020 | Germany | Sept. 19, 1957 |

OTHER REFERENCES

"Textbook of Organic Chemistry" (Wertheim), published by McGraw-Hill Book Co., Inc., (New York), 1951, pp. 164–165 relied on.